United States Patent Office 3,306,879
Patented Feb. 28, 1967

3,306,879
CURABLE COPOLYMERS OF TETRA-
FLUOROETHYLENE
Dexter B. Pattison, Wilmington, Del., assignor to E. I.
du Pont de Nemours and Company, Wilmington, Del.,
a corporation of Delaware
No Drawing. Filed June 25, 1962, Ser. No. 205,112
18 Claims. (Cl. 260—77.5)

This invention relates to a novel elastomeric copolymer. More particularly this invention relates to curable, fluorine-containing elastomeric copolymers.

Elastomers prepared from certain fluorine-containing monomers have become well-known for their outstanding properties. For example, copolymers containing, by weight, 70–30% of vinylidene fluoride and 30–70% of hexafluoropropene are elastomers of superior properties where resistance to high temperatures and to attack by hydrocarbon solvents is important. Copolymers containing units of vinylidene fluoride, hexafluoropropene, and tetrafluoroethylene in certain proportions are significantly superior in some respects to the polymers containing only vinylidene fluoride and hexafluoropropene units. The search continues, however, for additional elastomeric materials which are significantly superior in one or more properties, and which at the same time are economically attractive.

It is an object of this invention to provide novel fluorine-containing elastomeric copolymers. Another object is to provide new elastomeric copolymers which show excellent electrical insulation properties and good combined resistance to the effects of light, heat and chemicals.

A still further object is to provide novel elastomeric copolymers from relatively inexpensive monomers which copolymer combines the aforementioned properties. Other objects will appear hereinafter.

These and other objects of this invention are accomplished by providing a curable elastomeric copolymer comprising (a) about 45 to 55 mole percent of

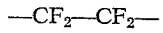

units, (b) about 54.8 to 35 mole percent of

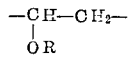

units and (c) about 0.2 to 10 mole percent of

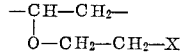

units wherein R is a saturated aliphatic hydrocarbon radical containing 1 to 18 carbon atoms or a radical

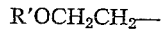

wherein R′ is a saturated aliphatic hydrocarbon radical containing 1 to 4 carbon atoms and X is a halogen radical of an atomic number of 17 to 53 (chlorine, bromine and iodine), the hydroxyl group or a radical of the structure

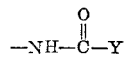

where Y is hydrogen or a saturated aliphatic hydrocarbon radical containing 1 to 8 carbon atoms. It is to be understood that R in the (b) units need not be the same in the copolymer.

The presence of the tetrafluoroethylene units

is an essential feature of this invention. Copolymers in which part or all of the tetrafluoroethylene units are replaced by units derived from other halogen-containing olefins, such as chlorotrifluoroethylene and hexafluoropropene, have poorer low-temperature properties and tend to be plastics at room temperature. It has been found that in copolymerizing tetrafluoroethylene with the comonomers providing the (b) and (c) units, the tetrafluoroethylene units are usually incorporated in an amount corresponding to approximately one mole of tetrafluoroethylene units to a total of one mole of the units (b) plus (c). The units (c) corresponding to the formula

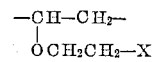

are essential to provide cure sites. If less than 0.2 mole percent of these units is present in the copolymer, the copolymer cannot be satisfactorily cured. On the other hand, if more than 10 mole percent of these units is present, the cost of the copolymer is increased, the thermal stability is usually inferior, and the elongation at break of the cured vulcanized elastomers tends to be undesirably low. The preferred proportions of (c) units is in the range of about 0.5 to 4 mole percent.

Examples of suitable monomers giving the (b) units of the above definition are methyl vinyl ether, ethyl vinyl ether, propyl vinyl ether, isopropyl vinyl ether, the various isomeric butyl vinyl ethers, 2-ethylhexyl vinyl ether, n-dodecyl vinyl ether, n-hexadecyl vinyl ether, n-octadecyl vinyl ether, 1-isobutyl-3,5-dimethylhexyl vinyl ether, 2-methoxyethyl vinyl ether, and 2-butoxyethyl vinyl ether. Mixtures of any of these monomers may be used. The preferred monomer is methyl vinyl ether because the copolymers prepared with this monomer in general show the most desirable properties. When the polymer contains, as the (b) component, both methyl vinyl ether units and units of an alkyl vinyl ether in which the alkyl group contains at least 3 carbon atoms, the copolymer shows improved low-temperature properties with some sacrifice in high-temperature stability. The preferred molar proportion of these higher alkyl vinyl ether units in the polymer is about 5 to 20 mole percent, based on the total molar amount of the (b) component present in the copolymer.

Examples of monomers which give (c) units of the above definition are 2-chloroethyl vinyl ether, 2-bromoethyl vinyl ether, 2-iodoethyl vinyl ether, 2-formamidoethyl vinyl ether, 2-acetamidoethyl vinyl ether, 2-octanoylaminoethyl vinyl ether, and 2-hydroxyethyl vinyl ether. The preferred comonomers are the chloroethyl, bromoethyl, and iodethyl vinyl ethers, the chloroethyl vinyl ether being most preferred.

The copolymers of this invention are prepared by copolymerizing a mixture of monomers using known techniques. The polymerization may be carried out in bulk or in the presence of an inert diluent such as water or an organic solvent. Examples of suitable organic solvents are ketones such as acetone and methyl ethyl ketone, esters such as butyl acetate and ethyl acetate, and alcohols such as isopropyl alcohol and tertiary butyl alcohol. Tertiary butyl alcohol is the preferred organic solvent for obtaining high-molecular weight polymers.

When using an aqueous medium it is helpful to use an emulsifying agent such as the alkali metal salts or ammonium salt of a long-chain alkyl sulfate. The use of an emulsifying agent is necessary if it is desired to obtain the copolymers in the form of a stable latex. The emulsifying agent should be used in amounts ranging from about 0.05 to about 5.0 percent by weight, based on the amount of monomers used in the polymerization. Other suitable emulsifying agents include the alkali metal or ammonium salts of long-chain fluorinated fatty acids, saturated fatty acids, or rosin acids. Specific examples are ammonium perfluoroctanoate, potassium stearate, and the sodium salt of tetrahydroabietic acid or a disproportionated rosin.

Polymerization is initiated by means of a conventional free-radical polymerization initiator. Well-known types of polymerization initiators are the compounds containing a peroxy group. Examples of these are hydrogen peroxide, benzoyl peroxide, cumene hydroperoxide, and water-soluble salts of persulfuric acid, such as sodium persulfate, potassium persulfate, and ammonium persulfate. Other types of free-radical polymerization initiators which may be used are the azo compounds disclosed in U.S. Patent 2,471,959, such as 2,2'-azobis(2-methylpropionitrile), and nitrogen fluorides. In an aqueous system it is preferred to use one of the persulfates because of their water solubility and ready availability. In an organic solvent such as tertiary butyl alcohol, it is preferred to use 2,2'-azobis(2-methylpropionitrile). The amount of polymerization initiator used will depend on many factors, including the nature of the initiator, the medium, the temperature, etc. Normally, not less than about 0.001 percent and not more than about 15 percent, based on total weight of monomers, is used. In the preferred systems using ammonium persulfate or 2,2'-azobis(2-methylpropionitrile), the amount used will range from about 0.05 to about 1 percent.

The polymerization is carried out at moderately elevated temperatures in the range of 30° C. to 150° C. Lower temperatures may be used, but the polymerization will proceed more slowly. Likewise, higher temperatures may be used with a corresponding increase in polymerization rates. In general, it is preferred to use as low a temperature at which a satisfactory rate of polymerization may be attained to avoid possibly deleterious effects of higher temperatures on the copolymers. Also a low reaction temperature tends to increase the molecular weight of the copolymers. The preferred temperatures range from about 50° C. to about 90° C.

The pressure used is not critical. Pressures may be as low as 100 p.s.i.g. initially or as high as 50,000 p.s.i.g. In general, the pressures used are those which normally develop in the closed system during the heating of the reaction mixture. The preferred initial pressure is about 150 to 600 p.s.i.g.

The polymerization should be carried out at pH's in the range of 7 to 10. If the medium becomes too acidic, hydrolysis of the vinyl ether may occur, and the desired polymerization does not take place.

Alkali metal sulfites or bisulfites may be used if desired with the persulfate catalysts to improve the rate of polymerization. Chain-transfer agents such as alkyl mercaptans, secondary alcohols (e.g., isopropanol) or ketones (e.g., acetone) may be employed in either aqueous or organic solvent systems to give lower-molecular-weight polymers.

The polymerization should be carried out in an inert atmosphere, such as in an atmosphere of nitrogen or argon. The reaction may be carried out in pressure vessels in which the surface exposed to the reaction mass is composed of an inert material such as stainless steel, glass, silver, etc. The polymerization may be carried out by a batch or a continuous process.

The copolymers are isolated by known methods. In a medium in which the polymer is not soluble, the liquid phase may be removed mechanically, and the polymer may then be washed and dried. If the polymer is prepared in latex form, the polymer may be coagulated, for example by freezing or by coagulation with salt, and removed mechanically from the separated liquid phase.

The copolymers of this invention may be used in the uncured state, or they may be compounded, fabricated, and cured in the same way as known fluoroelastomers. The presence in the copolymer of the units defined as (c) above make them even more readily curable than the known fluoroelastomers. Particularly the copolymers containing the pendant chloroethoxy, the bromoethoxy, or the iodoethoxy groups may be vulcanized by a wide variety of agents developed for other halogen-containing elastomers, such as vinylidene fluoride-hexafluoropropene copolymers and the polymers of chloroprene (2-chloro-1,3-butadiene). The curing rate in most recipes increases in the following order: chloro<bromo<iodo so that a shorter time in the press is required for the copolymers containing iodoethoxy groups, and the postcure to develop the optimum properties can be reduced or even eliminated for some applications. Examples of suitable curing agents are: organic peroxides, such as benzoyl peroxide, and bis($\alpha,\alpha$-dimethylbenzyl) peroxide; aliphatic polyamines, such as hexamethylenediamine, and tetraethylenepentamine; and derivatives of alphatic polyamines such as ethylenediamine carbamate, hexamethylenediamine carbamate, and N,N'-bis(arylalkylidene)alkylenediamines. Typical details of various methods of curing the known fluoroelastomers are given in the following references: U.S. Patents 2,951,832; 2,958,672; 2,965,553; 3,008,916; and 3,011,995. The following publications may also be consulted: Report No. 58–3, " 'Viton' A and 'Viton' A–HV," A. L. Moran and T. D. Eubank, Elastomer Chemicals Department, E. I. du Pont de Nemours and Co., Wilmington, Delaware, May 1958; and Report No. 59–4, "Viton' B," A. L. Moran, Elastomer Chemicals Department, E. I. du Pont de Nemours and Co., Wilmington, Delaware, October 1959.

The copolymers containing a pendant hydroxyl group may be cured by reacting them with organic polyisocyanates.

The copolymers of this invention may also be co-cured with known fluoroelastomers such as the copolymers of vinylidene fluoride and hexafluoropropene or the copolymers of vinylidene fluoride, hexafluoropropene, and tetrafluoroethylene.

The copolymers of this invention have many uses. The cured copolymers are characterized by excellent oil resistance, good solvent resistance, good thermal stability, excellent resistance to ozone, excellent flame resistance, and good electrical properties. They may be employed in the preparation of tires, inner tubes, belts, hose and tubing, wire and cable jackets, footwear, sponges, coated fabrics, and a wide variety of coated or molded articles. They are particularly suitable for electrical applications where resistance to heat and solvents is needed, such as wire coatings for use in motors.

The following examples will better illustrate the nature of the present invention; however, the invention is not intended to be limited to these examples. Parts are by weight unless otherwise indicated.

EXAMPLES

*General procedure.*—The method used in the following examples, unless otherwise indicated, is as follows:

Part of the reaction mixture, as indicated in the examples is placed in a 400-milliliter stainless steel shaker tube under nitrogen. The tube is cooled in a mixture of "Dry Ice" and acetone (about −78° C.), and is purged four times with nitrogen and vacuum, alternately, to remove air, the remainder of the polymerization system is then added and the tube is closed. The shaker tube is heated to the desired temperature with rapid agitation and is maintained at this temperature for the times indicated. The initial pressure at the operating temperature is usually 150–1000 p.s.i.g., and the pressure falls rapidly as the polymerization proceeds. The resultant latex is cooled in a mixture of "Dry Ice" and acetone and frozen solid and then warmed to room temperature, the supernatant fluid is removed by decantation, and the polymer is washed repeatedly with water in a Waring blendor. The polymer is dried on a rubber mill at 100° C. Inherent viscosities are measured at 30° C. using a solution of 0.1 gram of polymer in 100 milliliters of a solution consisting of 86 parts by weight of tetrahydrofuran and 14 parts by weight N,N-dimethylformamide.

Unless otherwise stated, the compounding recipe used in curing the polymers is as follows:

| | Parts by weight |
|---|---|
| Polymer | 100 |
| Medium thermal carbon black | 20 |
| Magnesium oxide | 15 |
| Hexamethylenediamine carbamate | 1.5 |

The material is compounded by blending on a rubber mill.

Test pieces are cured in a mold in a press for one hour at 180° C. and are then postcured in an oven as indicated in the various examples.

The properties of the polymer are determined as follows:

The stress-strain data (modulus, tensile strength, elongation and permanent set) are obtained at 25° C. using dumbbells 2.5 inches long and 1/16 inch wide at the narrowest section which are cut from a slab 0.04–0.05 inch thick. In Instron tensile testing machine, Model TT–B (Instron Engineering Corp.), is used at a cross-head speed of 10 inches per minute. The method followed is ASTM D 412-51 T. Yerzley resilience, hardness, and compression set are measured using pellets ½ inch thick and ¾ inch in diameter. The following methods are used:

Yerzley resilience _____ ASTM D 945–59.
Compression set _____ ASTM D 395–55, Method B, 70 hours at 121° C.
Hardness, Shore A _____ ASTM D 676–59 T.

In the tables shown below the following abbreviations are used:

$M_{100}$=modulus at 100% elongation, p.s.i.
$T_B$=tensile strength at the break, p.s.i.
$E_B$=elongation at the break, percent

*Example 1*

The initial charge added to the shaker tube is a mixture consisting of:

| | Grams |
|---|---|
| Potassium carbonate | 4 |
| 2,2'-azobis(2-methylpropionitrile) | 0.1 |
| Tertiary butyl alcohol | 156 |
| 2-chloroethyl vinyl ether | 1.06 |

After cooling and removing air, the following are weighed in:

| | Grams |
|---|---|
| Methyl vinyl ether | 28 |
| Tetrafluoroethylene | 48 |

The shaker tube is heated to 75° C. and is maintained at this temperature for 3 hours with rapid agitation. The maximum pressure attained is 160 p.s.i.g.

Seventy grams of product is obtained, which is a strong, tough elastomer. The inherent viscosity is 1.01.

Analyses show the following:

| | Percent by weight |
|---|---|
| F | 44.9 |
| C | 36.5 |
| H | 4.0 |
| Cl | 0.65 |

The composition of the polymer is approximately 50 mole percent tetrafluoroethylene units, 49 mole percent methyl vinyl ether units, and 1 mole percent 2-chloroethyl vinyl ether units.

The polymer is compounded using the following recipe:

| | Parts by weight |
|---|---|
| Polymer | 100 |
| Medium thermal carbon black | 30 |
| Magnesium oxide | 15 |
| Hexamethylenediamine carbamate | 1.5 |

A slab is cured one hour at 170° C. in a press.

Table I shows the vulcanizate properties of the polymer prepared in this example (Polymer A) compared with those of a copolymer prepared in the same way as Polymer A except that it contained equimolar amounts of units of tetrafluoroethylene and methyl vinyl ether and no 2-chloroethyl vinyl ether (Polymer B).

TABLE I

| | Polymer A | Polymer B |
|---|---|---|
| No Post Cure: | | |
| $M_{100}$ | 460 | 290 |
| $T_B$ | 1,120 | 320 |
| $E_B$ | 450 | >1,000 |
| Permanent Set, percent | 45 | 400 |
| After Post cure for 2 days at 204° C.: | | |
| $M_{100}$ | 1,760 | 480 |
| $T_B$ | 2,590 | 1,020 |
| $E_B$ | 220 | 430 |
| Permanent Set, percent | 14 | 30 |

*Example 2*

The initial charge added to the shaker tube is a mixture consisting of:

| | Grams |
|---|---|
| Potassium carbonate | 4 |
| 2,2'-azobis(2-methylpropionitrile) | 0.1 |
| Tertiary butyl alcohol | 200 |
| 2-chloroethyl vinyl ether | 6.4 |

After cooling and removing air, the following are weighed in:

| | Grams |
|---|---|
| Methyl vinyl ether | 26 |
| Tetrafluoroethylene | 50 |

The shaker tube is heated to 75° C. and is maintained at this temperature for 3 hours. The yield is 68 grams of a white, tough elastomer having an inherent viscosity of 1.02.

Analyses show the following:

| | Percent by weight |
|---|---|
| F | 47.2 |
| C | 37.5 |
| H | 4.5 |
| Cl | 2.7 |

The polymer composition is approximately 50 mole percent tetrafluoroethylene units, 44 mole percent methyl vinyl ether units, and 6 mole percent 2-chloroethyl vinyl ether units.

The polymer is compounded using the following recipe:

| | Parts by weight |
|---|---|
| Polymer | 100 |
| Medium thermal carbon black | 20 |
| Magnesium oxide | 15 |
| Ethylenediamine carbamate | 1.25 |

The compound is cured as described in Example 1. The properties are shown in Table II.

TABLE II

| Postcure | None | 1 day at 204° C. | 7 days at 204° C. | 1 day at 177° C. | 14 days at 177° C. |
|---|---|---|---|---|---|
| $M_{100}$ | 450 | 1,200 | 1,700 | 810 | 630 |
| $T_B$ | 1,920 | 2,750 | 2,760 | 2,280 | 2,520 |
| $E_B$ | 350 | 180 | 150 | 200 | 210 |
| Permanent Set, percent | 17 | 6 | 3 | 6 | 9 |
| Hardness, Shore A | | 73 | | 69 | |
| Yerzley Resilience, 25° C., percent | | 21 | | 13 | |
| Compression set, percent (70 hours at 121° C.) | | 8 | | 25 | |

Example 3

The initial charge to the shaker tube is:

| | Grams |
|---|---|
| Ammonium persulfate | 0.40 |
| Sodium sulfite | 0.10 |
| Sodium lauryl sulfate | 1.0 |
| Water | 175 |
| Sodium carbonate | 0.6 |
| 2-chloroethyl vinyl ether | 11.7 |

After cooling and removing air, the following are weighed in:

| | Grams |
|---|---|
| Methyl vinyl ether | 26 |
| Tetrafluoroethylene | 49 |

The polymerization is carried out for 2 hours at 50–60° C. The resulting latex is frozen solid in a "Dry-Ice"-acetone bath (about −78° C.) and is then warmed to room temperature. The solid polymer is washed on a wash mill and is dried on a mill at 100° C. The yield is 72 grams of an attractive, strong elastomer having an inherent viscosity of 2.75. The elastomer cures satisfactorily when compounded and cured as described above in the general procedure.

The composition of the resulting copolymer is about 50 mole percent tetrafluoroethylene units, 41 mole percent methyl vinyl ether units, and 9 mole percent 2-chloroethyl vinyl ether units.

Example 4

The substituted alkyl vinyl ether, 2-iodoethyl vinyl ether, is prepared as follows: The following mixture is refluxed for 5 hours at 86–89° C.

| | Grams |
|---|---|
| Sodium sulfite | 1 |
| Sodium carbonate | 1 |
| Sodium iodide | 105 |
| Ethanol (95%) | 85 |
| 2-chloroethyl vinyl ether | 72 |

To the reaction mixture is added 300 grams of water and 150 grams of chloroform. The lower layer is separated, washed with 10 percent potassium carbonate, and dried over anhydrous sodium sulfate.

On distillation there is obtained 33 grams of 2-chloroethyl vinyl ether (B.P. 26° C. at 20 mm. Hg) and 66 grams of 2-iodoethyl vinyl ether (B.P. 36° C. at 2 mm. Hg).

A copolymer is prepared as described above in the general procedure using the following ingredients:

Initial charge:

| | Grams |
|---|---|
| Potassium carbonate | 4 |
| 2,2'-azobis(2-methylpropionitrile) | 0.10 |
| Tertiary butyl alcohol | 156 |
| 2-iodoethyl vinyl ether | 1.9 |

After cooling:

| | Grams |
|---|---|
| Methyl vinyl ether | 29 |
| Tetrafluoroethylene | 50 |

The reaction is carried out at 75° C. for 3 hours. The yield is 60 grams of an elastomeric copolymer having an iodine content of 1.6 percent and an inherent viscosity of 0.59.

The composition of the copolymer is approximately 50 mole percent tetrafluoroethylene units, 49 mole percent methyl vinyl ether units, and 1 mole percent 2-iodoethyl vinyl ether units.

When compounded, cured and tested as described in the above general procedure the elastomer has the following properties:

TABLE OF EXAMPLE 4

| Postcure at 204° C. | None | 6 hours | 1 day | 7 days |
|---|---|---|---|---|
| $M_{100}$ | 550 | 960 | 990 | 1,880 |
| $T_B$ | 1,470 | 2,330 | 2,420 | 2,450 |
| $E_B$ | 200 | 180 | 180 | 130 |
| Permanent Set, percent | 5 | 5 | 5 | 4 |
| Hardness, Shore A | 68 | 69 | 70 | |
| Yerzley Resilience, 25° C., percent | 35 | 27 | 25 | |
| Yerzley Resilience, 100° C., percent | 81 | 84 | 83 | |
| Compression Set, percent (70 hours at 121° C.) | 29 | 18 | 13 | |

Example 5

A copolymer is prepared as described in Example 3 above using the following ingredients:

Initial charge:

| | Grams |
|---|---|
| Potassium persulfate | 0.40 |
| Sodium sulfite | 0.08 |
| Sodium lauryl sulfate | 0.8 |
| Sodium carbonate | 0.6 |
| Water | 200 |
| Isopropyl alcohol | 0.8 |
| 2-chloroethyl vinyl ether | 2.1 |

After cooling:

| | Grams |
|---|---|
| Methyl vinyl ether | 28 |
| Tetrafluoroethylene | 50 |

The polymerization is carried out for 2 hours at 50–60° C. The yield is 70 grams of a tough elastomer which is only 35 percent soluble in the tetrahydrofurandimethylformamide solvent mixture. Analyses show the following:

| | Percent by weight |
|---|---|
| Cl | 0.9 |
| F | 45.2 |
| C | 37.8 |
| H | 3.7 |

The polymer composition is approximately 50 mole percent tetrafluoroethylene units, 48 mole percent methyl vinyl ether units and 2 mole percent 2-chloroethyl vinyl ether units.

A white vulcanized elastomer is prepared by mixing the following on a rubber mill:

| | Parts by weight |
|---|---|
| Copolymer | 100 |
| Magnesium oxide | 15 |
| Titanium dioxide | 20 |
| Hexamethylenediamine carbamate | 1.25 |

The cure is carried out in a press for 1 hour at 180° C. The table given below shows the properties of the cured copolymers and the properties of a vulcanizate prepared in the same way from a commercially available copolymer of vinylidene fluoride and hexafluoropropene.

TABLE OF EXAMPLE 5

| Postcure | Copolymer of vinylidene fluoride and hexafluoropropene | | Copolymer of this Example | |
|---|---|---|---|---|
| | 1 day at 177° C. | 1 day at 204° C. | 1 day at 177° C. | 1 day at 204° C. |
| Color | (¹) | (²) | (³) | (⁴) |
| $M_{100}$ | 500 | 540 | 570 | 510 |
| $T_B$ | 2,100 | 2,840 | 2,560 | 2,690 |
| $E_B$ | 260 | 300 | 269 | 270 |
| Permanent Set, percent | 5 | 8 | 9 | 9 |
| Hardness, Shore A | 63 | 64 | 63 | 63 |
| Yerzley Resilience, 25° C., percent | 48 | 46 | 26 | 23 |
| Compression Set, percent (70 hours at 121° C.) | 32 | 30 | 18 | 9 |

¹ Light tan.
² Brown.
³ White.
⁴ Very light tan.

Example 6

A copolymer is prepared as described in Example 3 above using the following materials:

Initial charge:      Grams

Potassium carbonate _____ 4
     2,2'-azobis(2-methylpropionitrile) _____ 0.10
     Tertiary butyl alcohol _____ 140
     Ethyl vinyl ether _____ 38.5

After cooling:

2-chloroethyl vinyl ether _____ 2.1
     Tetrafluoroethylene _____ 50

Polymerization is carried out for 3 hours at 75° C. The yield is 79 grams of a copolymer with an inherent viscosity of 0.70. Analyses are 0.9% Cl, 39.6% F, 41.8% C, and 4.7% H. The polymer composition is approximately 50 mole percent tetrafluoroethylene units, 48 mole percent ethyl vinyl ether units, and 2 mole percent 2-chloroethyl vinyl ether units. When cured by the method of the general procedure given above and post-cured one day at 177° C., the tensile strength is 1640 p.s.i. and the elongation at break is 280%.

Example 7

A copolymer is prepared as described in Example 3 above using the following materials:

Initial charge:      Grams

Ammonium persulfate _____ 0.34
     Sodium sulfite _____ 0.08
     Sodium lauryl sulfate _____ 1.0
     Water _____ 200
     2-chloroethyl vinyl ether _____ 2.1
     Sodium carbonate _____ 0.7
     Isopropyl alcohol _____ 0.8
     2-ethylhexyl vinyl ether _____ 8.6

After cooling:

Methyl vinyl ether _____ 31
     Tetrafluoroethylene _____ 50

Polymerization is carried out at 50–60° C. for 2 hours. The yield is 69 grams of an attractive elastomer having an inherent viscosity of 1.37. Analyses are 41.3% C, 4.3% H, and 0.8% Cl. The polymer composition is approximately 50 mole percent tetrafluoroethylene units, 43 mole percent methyl vinyl ether units, 2 mole percent 2-chloroethyl vinyl ether units, and 5 mole percent 2-ethylhexyl vinyl ether units.

The copolymer is cured as described above in the general procedure. The properties of the vulcanizate are shown below:

| Postcure | None | 1 day at 204° C. |
|---|---|---|
| $M_{100}$ | 270 | 610 |
| $T_B$ | 1,580 | 2,440 |
| $E_B$ | 440 | 230 |
| Hardness, Shore A | 57 | 60 |
| Yerzley resilience, 25° C., percent | 58 | 46 |
| Yerzley resilience, 100° C., percent | 63 | 87 |
| Compression set, percent (70 hours at 121° C.) | 78 | 9 |
| Brittle Point, °C | | −48 |

Example 8

A copolymer is prepared as described in Example 3 above using the following materials:

Initial charge:      Grams

Ammonium persulfate _____ 0.34
     Sodium sulfite _____ 0.08
     Sodium lauryl sulfate _____ 1.0
     Isopropyl alcohol _____ 0.8
     Sodium carbonate _____ 0.7
     Water _____ 200
     2-chloroethyl vinyl ether _____ 2.1
     n-Butyl vinyl ether _____ 11

After cooling:

Methyl vinyl ether _____ 26
     Tetrafluoroethylene _____ 50

Polymerization is carried out at 50–60° C. for 2 hours. The yield is 55 grams of an elastomeric copolymer having an intrinsic viscosity of 2.32. Analyses show 40.2% C, 4.6% H, and 0.8% Cl.

The approximate polymer composition is 50 mole percent tetrafluoroethylene units, 38 mole percent methyl vinyl ether units, 2 mole percent 2-chloroethyl vinyl ether units, and 10 mole percent butyl vinyl ether units.

The copolymer is cured as described above in the general procedure. The properties of the vulcanizate are shown below.

| Postcure | None | 1 day at 204° C. |
|---|---|---|
| $M_{100}$ | 240 | 330 |
| $T_B$ | 1,490 | 2,520 |
| $E_B$ | 460 | 300 |
| Hardness, Shore A | 59 | 63 |
| Yerzley resilience, 25° C., percent | 61 | 47 |
| Yerzley resilience, 100° C., percent | 57 | 89 |
| Compression set, percent (70 hours at 121° C.) | 85 | 8 |
| Brittle point, ° C | | −49 |

*Example 9*

A copolymer is prepared as described in Example 8 except that the monomers used are as follows:

| | Grams |
|---|---|
| 2-chloroethyl vinyl ether | 2.1 |
| n-Butyl vinyl ether | 27.5 |
| Methyl vinyl ether | 17 |
| Tetrafluoroethylene | 50 |

The yield is 56 grams of a copolymer having an inherent viscosity of 1.05.

The composition of the polymer is approximately 50 mole percent tetrafluoroethylene units, 24 mole percent of methyl vinyl ether units, 24 mole percent of butyl vinyl ether units, and 2 mole percent of 2-chloroethyl vinyl ether units.

The copolymer is cured as described above in the general procedure except that the amount of hexamethylenediamine carbamate used in the recipe is 0.75 part, and 0.75 part of azalamide (1,7-heptanedicarboxamide) is included in the recipe as an auxiliary curing agent. The properties of the vulcanizate are shown below:

| Postcure | None | 4 hours at 204° C. |
|---|---|---|
| $M_{100}$ | 190 | 250 |
| $T_B$ | 640 | 2,570 |
| $E_B$ | >1,000 | 320 |
| Hardness, Shore A | 52 | 45 |
| Yerzley resilience, 25° C., percent | 65 | 66 |
| Yerzley resilience, 100° C., percent | 45 | 78 |
| Compression set, percent (70 hours at 121° C.) | 100 | 39 |

*Example 10*

A copolymer is prepared as described in Example 8 except that the monomers used are as follows:

| | Grams |
|---|---|
| 2-chloroethyl vinyl ether | 2.1 |
| 2-butoxyethyl vinyl ether | 15.8 |
| Methyl vinyl ether | 26 |
| Tetrafluoroethylene | 50 |

The yield is 87 grams of a white elastomer which mills well. Analyses are 41.1% C, 5.7% H, and 44.4% F.

The approximate polymer composition is 50 mole percent tetrafluoroethylene units, 38 mole percent methyl vinyl ether units, 10 mole percent 2-butoxyethyl vinyl ether units, and 2 mole percent 2-chloroethyl vinyl ether units.

The elastomer is cured by the method of the general procedure with a postcure at 180° C. for 6 hours to give an elastomer with fair tensile properties, high resilience, and good low-temperature properties.

*Example 11*

A copolymer is prepared using the following materials:

| | Grams |
|---|---|
| Initial charge: | |
| Ammonium persulfate | 0.40 |
| Sodium sulfite | 0.10 |
| Sodium lauryl sulfate | 1.0 |
| Sodium carbonate | 0.7 |
| Water | 175 |
| 2-chloroethyl vinyl ether | 2.1 |
| 1-isobutyl-3,5-dimethylhexyl vinyl ether | 7.0 |
| After cooling: | |
| Methyl vinyl ether | 33 |
| Tetrafluoroethylene | 49 |

Polymerization is carried out and the polymer is isolated as described in Example 3.

The yield is 64 grams of an elastomeric copolymer having an inherent viscosity of 1.99.

The composition of the polymer is approximately 50 mole percent tetrafluoroethylene units, 46 mole percent methyl vinyl ether units, 2 mole percent 1-isobutyl-3,5-dimethylhexyl vinyl ether units, and 2 mole percent 2-chloroethyl vinyl ether units.

*Example 12*

Into a 400-milliliter silver-lined shaker tube under nitrogen is put:

| | Grams |
|---|---|
| Sodium lauryl sulfate | 1.0 |
| 2,2′-azobis(2-methylpropionitrile) | 0.10 |
| Sodium sulfite | 0.5 |
| Dibasic sodium phosphate ($Na_2HPO_4 \cdot 7H_2O$) | 1.0 |
| 2-formamidoethyl vinyl ether | 2.2 |
| Water | 175 |

The tube is cooled in a "Dry-Ice"-acetone bath (−78° C.), evacuated, and 31 grams of methyl vinyl ether and 52 grams of tetrafluoroethylene are weighed in. The shaker tube is heated for 2 hours at 75° C. The product is isolated by the method of Example 3 to give 77 grams of an elastomeric copolymer which handles well on a rubber mill.

Analyses are:

| | |
|---|---|
| N (Kjeldahl) | percent 0.19 |
| C | do 39.0 |
| H | do 4.1 |
| Inherent viscosity | [1] 1.4 |

[1] Only 35% soluble.

The composition of the copolymer is approximately 50 mole percent tetrafluoroethylene units, 49 mole percent methyl vinyl ether units, and 1 mole percent 2-formamidoethyl vinyl ether units.

The elastomer is cured by the method of the general procedure given above (Recipe A) and also by the following curing recipe (Recipe B)

| | Parts by weight |
|---|---|
| Copolymer | 100 |
| Medium thermal carbon black | 20 |
| 1,3-bis(hydroxymethyl)2-imidazolidone (dimethylolethyleneurea) | 3 |
| Quinolinium tetrachlorozincate | 0.5 |

The properties of the vulcanizate are shown below:

| Postcure | Recipe A | | Recipe B | |
|---|---|---|---|---|
| | None | 1 day at 204° C. | None | 1 day at 204° C. |
| $M_{100}$ | 320 | 510 | 300 | 330 |
| $T_B$ | 1,140 | 2,890 | 930 | 1,940 |
| $E_B$ | 540 | 350 | 490 | 400 |

*Example 13*

A copolymer is prepared from 2-bromoethyl vinyl ether, methyl vinyl ether, and tetrafluoroethylene, as described below.

The initial charge to the shaker tube is:

| | Grams |
|---|---|
| Ammonium persulfate | 0.40 |
| Sodium sulfite | 0.10 |
| Sodium lauryl sulfate | 1.0 |
| Water | 175 |
| 2-bromoethyl vinyl ether | 2.8 |
| Sodium carbonate | 0.6 |

After cooling and removing air, the following are weighed in:

|  | Grams |
|---|---|
| Methyl vinyl ether | 30 |
| Tetrafluoroethylene | 50 |

The polymerization is carried out for 2 hours at 60° C. The product is isolated by the method of Example 3 and the yield is 70 grams of an attractive strong elastomer. The elastomer cures satisfactorily when compounded and cured as described in the above general procedure.

The composition of the polymer is about 50 mole percent tetrafluoroethylene units, 48 mole percent methyl vinyl ether units, and 2 mole percent 2-bromoethyl vinyl ether units.

*Example 14*

A copolymer is prepared from 2-hydroxyethyl vinyl ether, methyl vinyl ether, and tetrafluoroethylene, as described below. The initial charge to the shaker tube is exactly the same as in Example 13, except that 1.9 grams of 2-hydroxyethyl vinyl ether is employed instead of 2.8 grams of 2-bromoethyl vinyl ether. The polymerization is carried out for 2 hours at 60° C. with a maximum pressure of 350 p.s.i.g. The product is isolated by the method of Example 3. The yield is 75 grams of an attractive strong white elastomer, having the composition of about 50 mole percent tetrafluoroethylene units, 48 mole percent methyl vinyl ether units, and 2 mole percent 2-hydroxyethyl vinyl ether units.

The following materials are mixed thoroughly on a rubber mill:

|  | Parts by weight |
|---|---|
| Copolymer of this example | 100 |
| Medium thermal carbon black | 20 |
| 1,3-bis(3-isocyanato-4-methylphenyl)urea | 1 |

Samples are cured one hour at 160° C. in a press. Properties of the vulcanizate are:

| Postcure | None | 1 day at 190° C. |
|---|---|---|
| $M_{100}$ | 430 | 420 |
| $T_B$ | 1,890 | 1,900 |
| $E_B$ | 360 | 280 |

*Example 15*

A copolymer of methyl vinyl ether, tetrafluoroethylene and 2-chloroethyl vinyl ether is prepared as described in Example 5. A masterbatch is prepared using the following recipe:

|  | Parts by weight |
|---|---|
| Copolymer of Example 5 | 100 |
| Medium thermal carbon black | 20 |
| Magnesium oxide | 5 |
| Zinc oxide | 5 |

Samples of this masterbatch are mixed with various curing agents and are cured in a press for 1 hour at 180° C. and postcured in an oven for 4 hours at 200° C.

The curing agents used and amounts by weight, per 100 parts of copolymer are:

| | |
|---|---|
| A. 2-mercapto-2-imidazoline | 0.5 |
| B. Hexamethylenediamine carbamate | 1.5 |
| C. Catechol | 1.0 |
| D. o-Aminophenol | 1.0 |
| E. Dimethylthiourea | 1.0 |
| F. None | 1.0 |

Samples of the cured copolymers are immersed in acetone at room temperature and the percent gain in weight is measured after one day. The results are as follows:

| Samples: | Percent weight gain |
|---|---|
| A | 135 |
| B | 69 |
| C | 193 |
| D | 221 |
| E | 112 |
| F | 231 |

*Example 16*

An elastomeric copolymer of methyl vinyl ether, tetrafluoroethylene, and 2-chloroethyl vinyl ether is prepared as described in Example 5 and is cured as described in the general procedure using a postcure of 20 hours at 204° C.

The electrical properties of the cured elastomer are measured and are compared with two commercially available elastomers, one a copolymer of vinylidene fluoride and hexafluoropropene and the other a polychloroprene. The following table shows a comparison of the electrical properties.

|  | Copolymer of Ex. 5 | Vinylidene-hexafluoro-propene copolymer | Polychloroprene |
|---|---|---|---|
| Volume Resistivity, ohm-cm | $2.4 \times 10^{15}$ | $3.1 \times 10^{13}$ | $2 \times 10^{12}$ |
| Dielectric constant at 1,000 cycles/second | 8.9 | 16.9 | 7.5 |
| Power Factor, percent at 1,000 cycles/second | 2.8 | 3.5 | 3 |
| Dielectric strength, volts/mil | 531 | 258 | 500 |

Dielectric strength is measured by ASTM Method D 149–59 T.
Dielectric constant and power factor are measured by ASTM Method D 150–59 T.
Volume Resistivity is measured by ASTM Method D 257–58.

*Example 17*

An elastomeric copolymer of the approximate composition 50 mole percent tetrafluoroethylene units, 49.5 mole percent methyl vinyl ether units, and 0.5 mole percent 2-chloroethyl vinyl ether units is prepared as described below. The initial charge to the shaker tube is:

|  | Grams |
|---|---|
| Ammonium persulfate | 0.40 |
| Sodium sulfite | 0.10 |
| Sodium tetradecyl sulfate | 0.75 |
| Water | 175 |
| Sodium bicarbonate | 0.50 |
| Sodium carbonate | 0.10 |
| 2-chloroethyl vinyl ether | 0.50 |

After cooling and removing air, the following are weighed in:

|  | Grams |
|---|---|
| Methyl vinyl ether | 32 |
| Tetrafluoroethylene | 54 |

The polymerization is carried out for one hour at 60–65° C. The resultant latex is coagulated by adding it dropwise to a stirred solution of 70 grams of sodium chloride in 500 grams of water. The polymer is isolated by filtration, washed thoroughly with water to remove salts, and dried on a mill at 100° C. The yield is 81 grams of an attractive white elastomer.

The copolymer is cured as described under general procedure except that the curing agent is 1 part tetraethylenepentamine and the curing temperature is 160° C. The elastomer has the following properties:

| Postcure | None | 20 hours at 193° C. |
|---|---|---|
| $M_{100}$ | 640 | 780 |
| $T_B$ | 2,300 | 2,980 |
| $E_B$ | 310 | 250 |

As many widely different embodiments of this invention may be made without departing from the spirit and scope thereof, it is to be understood that this invention is not limited to the specific embodiments thereof except as defined in the appended claims.

What is claimed is:

1. A curable elastomeric copolymer comprising (a) about 45 to 55 mole percent of —CF$_2$—CF$_2$— units, (b) about 54.8 to 35 mole percent of units selected from the group consisting of $$-\underset{\underset{OR}{|}}{C}H-CH_2-$$

units and mixtures of said units bearing different R radicals as defined hereinafter, wherein R is a member of the group consisting of a saturated aliphatic hydrocarbon radical containing 1 to 18 carbon atoms and the R'OCH$_2$CH$_2$— radical where R' is a saturated aliphatic hydrocarbon radical containing 1 to 4 carbon atoms and (c) about 0.2 to 10 mole percent of $$-\underset{\underset{O-CH_2-CH_2-X}{|}}{C}H-CH_2-$$

units where X is a member of the group consisting of a halogen radical of an atomic number of 17 to 53, the hydroxyl group and a $$-NH-\overset{O}{\underset{\|}{C}}-Y$$

radical where Y is a member of the group consisting of hydrogen and a saturated aliphatic hydrocarbon radical containing 1 to 8 carbon atoms.

2. A curable elastomeric copolymer as defined in claim 1 where said R is methyl.

3. A curable elastomeric copolymer as defined in claim 1 where said X is a halogen of atomic number 17–53.

4. A curable elastomeric copolymer as defined in claim 1 where R is a saturated aliphatic hydrocarbon radical containing 3 to 18 carbon atoms in about 5 to about 20 mole percent of said (b) units and in the remainder of said (b) units R is methyl.

5. A curable elastomeric copolymer as defined in claim 1 where said (c) units are present in about 0.5 to 4 mole percent.

6. A curable elastomeric copolymer as defined in claim 1 where said X is chlorine.

7. A curable elastomeric copolymer as defined in claim 1 where said X is bromine.

8. A copolymer as defined in claim 1 which has been cured.

9. A cured elastomeric copolymer obtained by mixing a member of the group consisting of hexamethylenediamine carbamate and ethylenediamine carbamate and the curable copolymer of claim 1 wherein X is a halogen radical of atomic number 17 to 53 and heating said mixture.

10. A cured elastomeric copolymer obtained by mixing hexamethylenediamine carbamate and the curable copolymer of claim 1 wherein X is chlorine and heating said mixture.

11. A cured elastomeric copolymer obtained by mixing an organic polyisocyanate and the curable copolymer of claim 1 wherein X is the hydroxyl group and heating said mixture.

12. A curable elastomeric copolymer comprising (a) about 50 mole percent of —CF$_2$—CF$_2$— units, (b) about 40 to 49.5 mole percent of units selected from the group consisting of $$-\underset{\underset{OR}{|}}{C}H-CH_2-$$

units and mixtures of said units bearing different R radicals as defined hereinafter, R being a member of the group consisting of a hydrocarbon radical containing 1 to 18 carbon atoms and the R'OCH$_2$—CH$_2$— radical where R' is a saturated aliphatic hydrocarbon radical containing 1 to 4 carbon atoms and (c) about 0.5 to 10 mole percent of $$-\underset{\underset{O-CH_2-CH_2X}{|}}{C}H-CH_2-$$

units where X is a member of the group consisting of a halogen radical of an atomic number of 17 to 53, the hydroxyl group and a $$-NH-\overset{O}{\underset{\|}{C}}-Y$$

radical where Y is a member of the group consisting of hydrogen and a saturated aliphatic hydrocarbon radical containing 1 to 8 carbon atoms.

13. A curable elastomeric copolymer as defined in claim 12 where said R is methyl.

14. A curable elastomeric copolymer as defined in claim 13 where said (c) units are present in about 0.5 to 4 mole percent.

15. A curable elastomeric copolymer as defined in claim 12 where X is chlorine and where R is methyl.

16. A curable elastomeric copolymer as defined in claim 12 where X is bromine.

17. A curable elastomeric copolymer as defined in claim 12 where R is a saturated aliphatic hydrocarbon radical containing 3 to 18 carbon atoms in about 5 to about 20 mole percent of said (b) units and in the remainder of said (b) units R is methyl.

18. A copolymer as defined in claim 12 which has been cured.

References Cited by the Examiner

UNITED STATES PATENTS

| | | | |
|---|---|---|---|
| 2,468,664 | 4/1949 | Hanford et al. | 260—87.5 |
| 2,727,020 | 12/1955 | Melamed | 260—80.3 |
| 2,779,025 | 1/1957 | Perry | 260—87.5 |
| 2,834,767 | 5/1958 | Hoyt | 260—87.5 |
| 2,871,203 | 1/1959 | Melamed | 260—87.5 |
| 2,975,164 | 3/1961 | Crawford | 260—88.1 |
| 2,991,278 | 7/1961 | Schildknecht | 260—80.7 |
| 3,163,628 | 12/1964 | Bolstad | 260—87.5 |
| 3,171,830 | 3/1965 | Kehr | 260—88.2 |
| 3,235,537 | 2/1966 | Albin et al. | 260—80.5 |

LEON J. BERCOVITZ, *Primary Examiner.*

DONALD E. CZAJA, *Examiner.*

M. C. JACOBS, F. McKELVEY, *Assistant Examiners.*